United States Patent
Takahashi et al.

(10) Patent No.: US 7,448,205 B2
(45) Date of Patent: Nov. 11, 2008

(54) EXHAUST GAS PURIFYING DEVICE AND EXHAUST GAS PURIFYING METHOD IN INTERNAL COMBUSTION ENGINE

(75) Inventors: Yoshiyuki Takahashi, Kariya (JP); Hisanobu Suzuki, Toyota (JP)

(73) Assignees: Kabushiki Kaisha Toyota Jidoshokki, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/594,872

(22) PCT Filed: Mar. 23, 2005

(86) PCT No.: PCT/JP2005/005284

§ 371 (c)(1),
(2), (4) Date: Apr. 19, 2007

(87) PCT Pub. No.: WO2005/098220

PCT Pub. Date: Oct. 20, 2005

(65) Prior Publication Data

US 2007/0193564 A1     Aug. 23, 2007

(30) Foreign Application Priority Data

Mar. 31, 2004    (JP) .............................. 2004-107226

(51) Int. Cl.
*F01N 3/00*    (2006.01)
(52) U.S. Cl. ....................... 60/285; 60/274; 60/278; 60/280; 60/287; 60/292; 60/600; 60/602; 60/605.2; 123/568.11

(58) Field of Classification Search ............... 60/274, 60/278, 280, 286, 287, 288, 291, 292, 324, 60/600, 602, 605.2, 612; 123/568.11, 568.12, 123/568.18, 568.19, 568.2
See application file for complete search history.

(56) References Cited

U.S. PATENT DOCUMENTS

| | | | |
|---|---|---|---|
| 5,562,086 A * | 10/1996 | Asada et al. ............ | 123/568.21 |
| 5,582,004 A | 12/1996 | Rutschmann ................. | 60/288 |
| 6,917,873 B2 * | 7/2005 | Itoyama ....................... | 701/108 |

(Continued)

FOREIGN PATENT DOCUMENTS

JP            50-13718        2/1975

(Continued)

*Primary Examiner*—Binh Q. Tran
(74) *Attorney, Agent, or Firm*—Woodcock Washburn LLP (57) ABSTRACT

Catalysts are respectively provided in a plurality of parallel exhaust paths of an internal combustion engine. A flow rate adjusting section adjusts a flow rate of an exhaust gas discharged from a first exhaust path to a downstream side, and a flow rate of an exhaust gas supplied to an intake path from the first exhaust path via a first exhaust gas recirculating path. A control section controls the flow rate adjusting section in such a manner that a ratio of the flow rate of the exhaust gas discharged from the first exhaust path with respect to the flow rate of the exhaust gas discharged from the other exhaust paths than the first exhaust path becomes smaller in the case that a temperature of the catalyst exists in a preset low temperature region than in other cases. Accordingly, it is possible to achieve an early activation in at least one of a plurality of catalysts while avoiding an addition of mechanisms.

12 Claims, 8 Drawing Sheets

U.S. PATENT DOCUMENTS

| | | |
|---|---|---|
| 7,073,465 B2 * | 7/2006 | Woll et al. .................. 123/1 A |
| 7,080,635 B2 * | 7/2006 | Sato ........................ 123/568.2 |
| 7,107,761 B2 * | 9/2006 | Fukuma et al. ............... 60/285 |

FOREIGN PATENT DOCUMENTS

| | | |
|---|---|---|
| JP | 03-281929 | 12/1991 |
| JP | 04-237814 | 8/1992 |
| JP | 08-246889 | 9/1996 |
| JP | 09-096213 | 4/1997 |
| JP | 10-061503 | 3/1998 |
| JP | 2003-097254 | 4/2003 |
| JP | 2003-148225 | 5/2003 |
| JP | 2003-269155 | 9/2003 |
| JP | 2003-278606 | 10/2003 |
| JP | 2003-343244 | 12/2003 |

\* cited by examiner

EXHAUST GAS PURIFYING DEVICE AND EXHAUST GAS PURIFYING METHOD IN INTERNAL COMBUSTION ENGINE

FIELD OF THE INVENTION

The present invention relates to an exhaust gas purifying apparatus in an internal combustion engine in which a plurality of exhaust paths are arranged in parallel, and a catalyst utilized for purifying unclean substances contained in the exhaust gas is provided in each of a plurality of exhaust paths, and an exhaust gas purifying method.

BACKGROUND OF THE INVENTION

Conventionally, there has been widely employed a structure in which a catalyst is arranged in the exhaust path of an engine so as to be utilized for purifying the exhaust gas. As a typical structure, there can be listed up a three-way catalyst of a gasoline engine, or a nitrogen oxide occlusion reduction type catalyst arranged integrally with or in a front side of a particulate filter in a diesel engine and promoting oxidization (incineration) of the collected particulate or the like. Some V-type engines and the like employ a structure in which a plurality of exhaust paths are arranged in parallel, for example, an exhaust gas purifying apparatus provided with a catalyst device in each of a pair of exhaust paths arranged in parallel is disclosed in patent documents 1 and 2.

In the apparatus disclosed in patent document 1, a pair of exhaust paths are connected by a connection conduit pipe in an upstream side of the catalyst device, and a throttle valve is provided in a portion of the exhaust path in a downstream side of a joint portion between one of the exhaust paths and the connection conduit pipe and in an upstream side of the catalyst device. In a low temperature state in which the catalyst device is not sufficiently activated, the throttle valve is closed, and the exhaust gas is discharged only from the other exhaust path.

In the apparatus disclosed as a fourth embodiment of patent document 2, a first exhaust passage and a second exhaust passage are connected via a switching valve in an upstream side of the catalyst device. In a high temperature state in which the catalyst device is sufficiently activated, the switching valve can be switched to a state in which the exhaust gas is discharged from both of the exhaust paths.

In a low temperature state (for example, just after the engine start) in which the catalyst device is not sufficiently activated, it is hard to expect the exhaust gas purification by the catalyst device. The structure in which the exhaust gas is discharged only from one exhaust path quickens a temperature rise of the catalyst device arranged in the exhaust path through which the exhaust gas passes so as to promote an early activation of the catalyst device.

However, in the apparatus disclosed in the patent documents 1 and 2, there is required a complicated structure to which a new piping and a new valve apparatus for communicating a pair of exhaust paths in the upstream side of the catalyst device.

Patent Document 1: Japanese Laid-Open Patent Publication No. 50-13718
Patent Document 2: Japanese Laid-Open Patent Publication No. 3-281929
Patent Document 3: Japanese Laid-Open Patent Publication No. 2003-269155

SUMMARY OF THE INVENTION

Accordingly, it is an objective of the present invention to provide an exhaust gas purifying apparatus in an internal combustion engine which achieves an early activation in at least one of a plurality of catalysts while avoiding an addition of mechanisms as much as possible, and an exhaust gas purifying method.

In order to achieve the objective mentioned above, the present invention provides an exhaust gas purifying apparatus in an internal combustion engine. The engine is provided with an intake path, and a plurality of parallel exhaust paths including at least first and second exhaust paths. The purifying apparatus is provided with catalysts respectively arranged in a plurality of the exhaust paths for purifying unclean substances contained in the exhaust gas. The purifying apparatus is provided with a first exhaust gas recirculating path for supplying the exhaust gas from the first exhaust path to the intake path, and a second exhaust gas recirculating path for supplying the exhaust gas from the second exhaust path to the intake path. The purifying apparatus is provided with a flow rate adjusting section adjusting a flow rate of the exhaust gas discharged from the first exhaust path to a downstream side, and a flow rate of the exhaust gas supplied to the intake path from the first exhaust path via the first exhaust gas recirculating path. The purifying apparatus is provided with a control section controlling the flow rate adjusting section on the basis of information relating to the temperature of at least one of the catalysts. The control section controls the flow rate adjusting section in such a manner that a ratio of the flow rate of the exhaust gas discharged from the first exhaust path with respect to the flow rate of the exhaust gas discharged from the other exhaust paths than the first exhaust path becomes smaller in a case that the temperature exists in a preset low temperature region than in the other case.

For example, in the case that the temperature does not exist in the preset low temperature region, the exhaust gas is discharged from each of the exhaust paths uniformly (that is, one half each in the case that the number of the exhaust paths is two, and one third each in the case that the number of the exhaust paths is three). Accordingly, in the case that the temperature exists in the low temperature region, the flow rate of the exhaust gas discharged from the other exhaust paths becomes more than the flow rate of the exhaust gas discharged from the first exhaust path. Accordingly, the catalysts provided in the other exhaust paths than the first exhaust path are early activated. In this case, the information relating to the temperature of the catalyst includes information regarded as reflecting the temperature of the catalyst itself, for example, information of a detected exhaust temperature, an estimated exhaust temperature, a temperature of a cooling water for cooling the engine, an engine load and the like, in addition to the detected temperature of the catalyst itself.

An apparatus (an exhaust gas recirculating apparatus) recirculating the exhaust gas to the intake path so as to contribute to a suppression of generation of the unclean substances is known, for example, in patent document 3. In the engine provided with the apparatus mentioned above, a new mechanism for supplying the exhaust gas to the intake path is not required for executing the present invention mentioned above. Accordingly, the present invention has an excellent advantage that it is possible to intend to achieve an early activation in at least one of a plurality of catalysts while avoiding an addition of the mechanism as much as possible.

Further, the present invention provides another exhaust gas purifying apparatus. The purifying apparatus is attached to an internal combustion engine which is provided with an intake path, first and second parallel exhaust paths. In order to purify the exhaust gas, the catalyst is provided in each of the first and second exhaust path. The purifying apparatus is provided with a first exhaust gas recirculating path for supplying the exhaust gas to the intake path from the first exhaust path, and a second exhaust gas recirculating path for supplying the exhaust gas to the intake path from the second exhaust path. A flow rate adjusting section adjusts a flow rate of the exhaust gas discharged to a downward side from the first and second exhaust paths, and a flow rate of the exhaust gas supplied to the intake path from the first and second exhaust paths via the corresponding exhaust gas recirculating paths. A control section controls the flow rate adjusting section on the basis of the information relating to the temperature of at least one of the catalysts. The control section controls the flow rate adjusting section in such a manner that a ratio of the flow rate of the exhaust gas discharged from the first exhaust path with respect to the flow rate of the exhaust gas discharged from the second exhaust path becomes smaller in a case that the temperature exists in a preset low temperature region than in other cases.

In the case that the temperature exist in the low temperature region, the flow rate of the exhaust gas discharged from the second exhaust path becomes more than the flow rate of the exhaust gas discharged from the first exhaust path. Accordingly, the catalyst provided in the second exhaust path is early activated.

The purifying apparatus can be provided with a variable nozzle type turbocharger supplying an air by utilizing the exhaust gas flow. The turbocharger includes a turbine portion provided at lease one of the first and second exhaust paths. The flow rate adjusting section can be provided with the turbine portion, and a flow rate adjusting valve adjusting a flow rate in at least one of the exhaust gas recirculating paths. The exhaust gas recirculating path is connected to a portion of the exhaust path in an upstream side of the turbine portion. The control section can control an opening degree of a vane provided in the turbine portion, and an opening degree of the flow rate adjusting valve.

In the case that the temperature does not exist in the preset low temperature region, the control section can, for example, execute a normal control with respect to the variable nozzle type turbocharger corresponding to the first exhaust path, and execute a normal control with respect to the flow rate adjusting valve corresponding to the first exhaust recirculating path. The normal control with respect to the variable nozzle type turbocharger means controlling a supercharging pressure. The normal control with respect to the flow rate adjusting valve means controlling the combustion temperature within the combustion chamber of the internal combustion engine by adjusting the exhaust gas supply flow rate. In the case that the temperature exist in the preset low temperature region, the control section can, for example, make the opening degree of the vane in the variable nozzle type turbocharger corresponding to the first exhaust path small, and make the valve opening degree in the flow rate adjusting valve corresponding to the first exhaust gas recirculating path large. Accordingly, the discharge flow rate of the exhaust gas discharged from the first exhaust path becomes smaller than the case that the temperature does not exist in the low temperature region, and the flow rate of the exhaust gas supplied to the intake path from the first exhaust path becomes larger than the case that the temperature does not exist in the low temperature region. Accordingly, the catalysts provided in the other exhaust paths than the first exhaust path are early activated.

The exhaust gas purifying apparatus can be provided with an exhaust throttle valve provided in the portion of the first exhaust path in a downstream side of a joint portion between the first exhaust gas recirculating path and the first exhaust path. The flow rate adjusting section can be provided with the exhaust throttle valve, and a flow rate adjusting valve adjusting a flow rate in at least one exhaust gas recirculating path.

The control section can control an opening degree of the exhaust throttle valve, and an opening degree of the flow rate adjusting valve.

In the case that the temperature does not exist in the preset low temperature region, the control section can, for example, control the opening degree of the flow rate adjusting valve to the normal state as well as making the opening degree of the exhaust throttle valve corresponding to the first exhaust path large. In the case that the temperature exist in the preset low temperature region, the control section can, for example, make the opening degree of the flow rate adjusting valve corresponding to the first exhaust gas recirculating path large as well as making the opening degree of the exhaust throttle valve corresponding to the first exhaust path small. Accordingly, the discharge flow rate of the exhaust gas discharged from the first exhaust path becomes smaller than the case that the temperature does not exist in the low temperature region, and the flow rate of the exhaust gas supplied to the intake path from the first exhaust path becomes larger than the case that the temperature does not exist in the preset low temperature region. Therefore, the catalysts provided in the other exhaust paths than the first exhaust path are early activated.

The control section can control the flow rate adjusting section in such a manner that the exhaust gas is not discharged from the first exhaust path, in the case that the temperature exists in the low temperature region.

In this case, the exhaust gas is not discharged from the first exhaust path, but all the exhaust gas is discharged from the other exhaust paths than the first exhaust path. That is, in the case that the temperature exists in the preset low temperature region, all the exhaust gas is utilized for early activating the catalysts provided in the other exhaust paths than the first exhaust path.

Further, the present invention provides an exhaust gas purifying method in an internal combustion engine provided with an intake path and parallel first and second exhaust paths. The exhaust gas discharged from the first and second exhaust paths is purified by the catalysts respectively provided in the first and second exhaust paths. The exhaust gas is recirculated to the intake path from the first exhaust path. The exhaust gas is recirculated to the intake path from the second exhaust path. There is acquired an information relating to the temperature of at least one of the catalysts. A flow rate of an exhaust gas discharged to a downstream side from the first and second exhaust paths, and a flow rate of an exhaust gas recirculated to the intake path from the first and second exhaust paths are controlled in such a manner that a ratio of the flow rate of the exhaust gas discharged from the first exhaust path with respect to the flow rate of the exhaust gas discharged from the second exhaust path becomes smaller in the case that the temperature exists in a preset low temperature region than the other cases.

DETAILED DESCRIPTION OF THE PREFERRED EMBODIMENTS

A description will be given below of a first embodiment obtained by embodying the present invention with reference to FIGS. 1 and 2.

Figure 1:
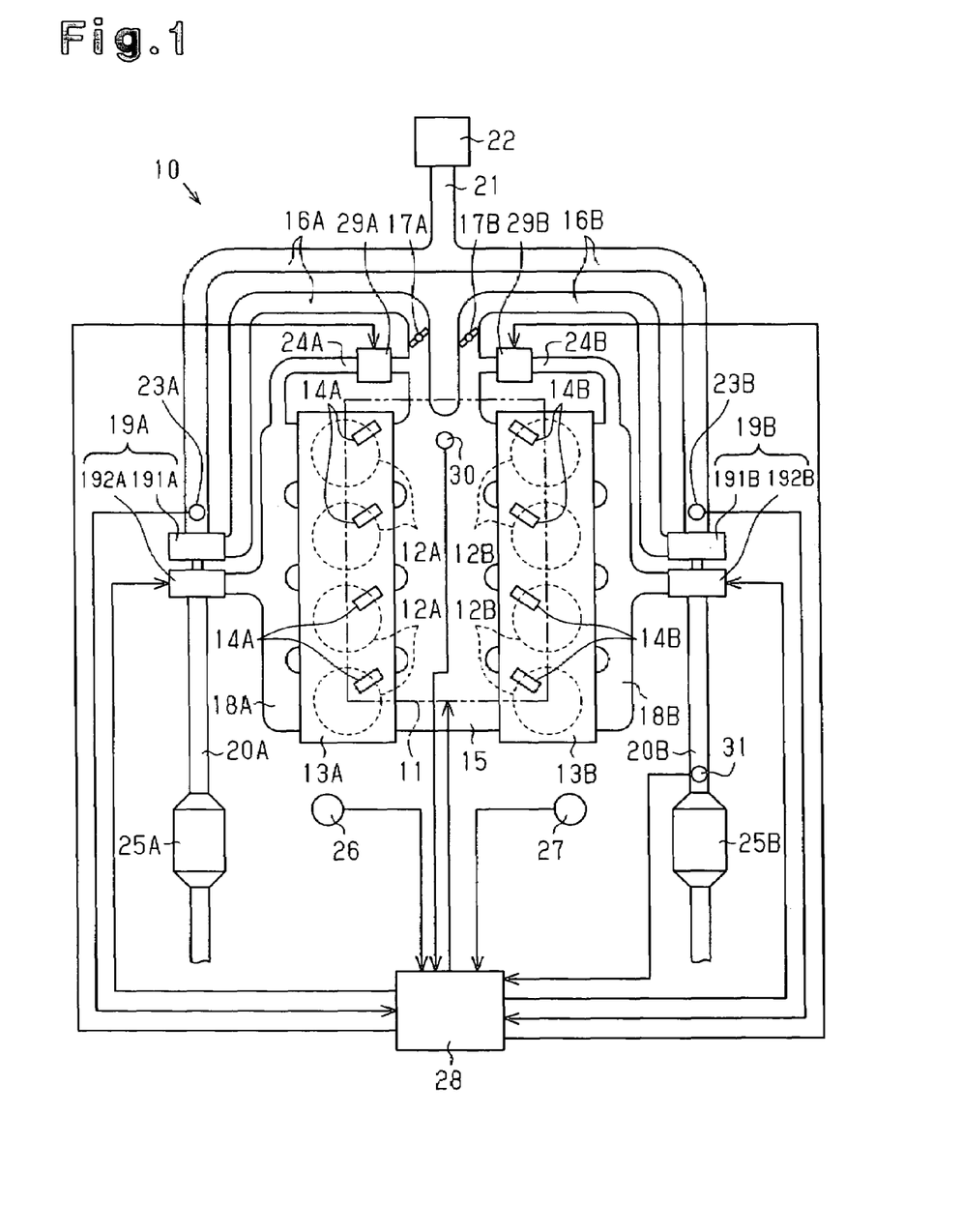
FIG. 1 is a general diagram of an exhaust gas purifying apparatus according to a first embodiment of the present invention.

As shown in FIG. 1, an internal combustion engine 10 mounted on a vehicle is provided with a plurality of cylinders 12A and 12B. A plurality of the cylinders 12A and 12B are divided into two groups. Fuel injection nozzles 14A are attached to a cylinder head 13A corresponding to the cylinders 12A in one group per each cylinder 12A. Fuel injection nozzles 14B are attached to a cylinder head 13B corresponding to the cylinders 12B in the other group per each cylinder 12B. The fuel injection nozzles 14A and 14B inject a fuel into the corresponding cylinders 12A and 12B. A fuel injection apparatus 11 includes the fuel injection nozzles 14A and 14B.

An intake manifold 15 is connected to the cylinder heads 13A and 13B. The intake manifold 15 is connected to branch intake passages 16A and 16B. A compressor portion 191A of a supercharger 19A is interposed in the middle of the branch intake passage 16A. A compressor portion 191B of a supercharger 19B is interposed in the middle of the branch intake passage 16B. The superchargers 19A and 19B are constituted by a known variable nozzle type turbocharger actuated by an exhaust gas flow.

The branch intake passages 16A and 16B are connected to a main intake passage 21. The main intake passage 21 is connected to an air cleaner 22. Throttle valves 17A and 17B are provided in the middle of portion of the intake passages 16A and 16B between the superchargers 19A and 19B and the intake manifold 15. The throttle valves 17A and 17B adjust a flow rate of an intake air sucked into the branch intake passages 16A and 16B via the air cleaner 22 and the main intake passage 21. The throttle valves 17A and 17B are adjusted an opening degree in accordance with an operation of an accelerator pedal (not shown).

A depression degree of the accelerator pedal is detected by an accelerator pedal position detector 26. A rotation angle (a crank angle) of a crankshaft (not shown) is detected by a crank angle detector 27. Depression degree detection information detected by the accelerator pedal position detector 26 and crank angle detection information detected by the crank angle detector 27 are transmitted to a control computer 28. The control computer 28 calculates and controls a fuel injection period (an injection start timing and an injection end timing) in the fuel injection nozzles 14A and 14B on the basis of the depression degree detection information and the crank angle detection information.

The air sucked into the main intake passage 21 is branched into the branch intake passages 16A and 16B, and the air flowing through the branch intake passages 16A and 16B is combined within the intake manifold 15. That is, the intake air delivered from the compressor portions 191A and 191B of the superchargers 19A and 19B is combined within the intake manifold 15 so as to be supplied to the cylinders 12A and 12B. The main intake passage 21 and the branch intake passages 16A and 16B constitute an intake path.

An exhaust manifold 18A is connected to the cylinder head 13A, and an exhaust manifold 18B is connected to the cylinder head 13B. The exhaust gas generated in the cylinders 12A and 12B is discharged to the exhaust manifolds 18A and 18B. The exhaust manifold 18A is connected to an exhaust passage 20A via a turbine portion 192A of the supercharger 19A. The exhaust manifold 18B is connected to an exhaust passage 20B via a turbine portion 192B of the supercharger 19B. In the present embodiment, a minimum state of a vane opening degree in the turbine portions 192A and 192B of the superchargers 19A and 19B corresponds a state in which the exhaust gas can not pass through the turbine portions 192A and 192B. The exhaust passages 20A and 20B correspond to exhaust paths arranged in parallel.

An air flowmeter 23A is arranged in a portion of the branch intake passage 16A in an upstream side of the compressor portion 191A of the supercharger 19A. An air flowmeter 23B is arranged in a portion of the branch intake passage 16B in an upstream side of the compressor portion 191B of the supercharger 19B. The air flowmeter 23A serving as an intake flow rate detecting portion detects an intake flow rate within the branch intake passage 16A, and the air flowmeter 23B serving as the intake flow rate detecting portion detects an intake flow rate within the branch intake passage 16B. Information of the intake flow rate detected by the air flowmeter 23A, and information of the intake flow rate detected by the air flowmeter 23B are transmitted to the control computer 28.

The portion of the branch intake passage 16A in the downstream side of the throttle valve 17A and the exhaust manifold 18A are connected via an exhaust gas supply passage 24A, and a flow rate adjusting valve 29A is interposed in the exhaust gas supply passage 24A. The portion of the branch intake passage 16B in the downstream side of the throttle valve 17B and the exhaust manifold 18B are connected via an exhaust gas supply passage 24B, and a flow rate adjusting valve 29B is interposed in the exhaust gas supply passage 24B. The flow rate adjusting valves 29A and 29B are controlled by the control computer 28.

In the case that the valve opening degree in the flow rate adjusting valve 29A is not zero, the exhaust gas within the exhaust manifold 18A can flow out to the branch intake passage 16A via the exhaust gas supply passage 24A. In the case that the valve opening degree in the flow rate adjusting valve 29B is not zero, the exhaust gas within the exhaust manifold 18B can flow out to the branch intake passage 16B via the exhaust gas supply passage 24B. In the present embodiment, a minimum state of the valve opening degree in the flow rate adjusting valves 29A and 29B corresponds to a state in which the exhaust gas can not pass through the flow rate adjusting valves 29A and 29B.

A pressure detector 30 is arranged in the intake manifold 15. The pressure detector 30 detects a pressure (a supercharging pressure) within the intake manifold 15 (in the portion of the intake path in the downstream side of the superchargers 19A and 19B). Information of the supercharging pressure detected by the pressure detector 30 is transmitted to the control computer 28.

Catalysts 25A and 25B are interposed on the exhaust passages 20A and 20B. The catalysts 25A and 25B are constituted, for example, by a nitrogen oxide occlusion reducing type catalyst carried by a filter provided in the exhaust passages 20A and 20B in the case that the internal combustion engine 10 is constituted by a diesel engine. The catalysts 25A and 25B utilize a nitrogen oxide contained in the exhaust gas, and promote oxidization (combustion) of the particulate collected in the filter.

A temperature detector 31 is provided in a portion of the exhaust passage 20B in an upstream side of the catalyst 25B. The temperature detector 31 detects a temperature (an exhaust gas temperature) of the exhaust gas flowing within the exhaust passage 20B. Information of the exhaust gas temperature detected by the temperature detector 31 is transmitted to the control computer 28.

Figure 2:
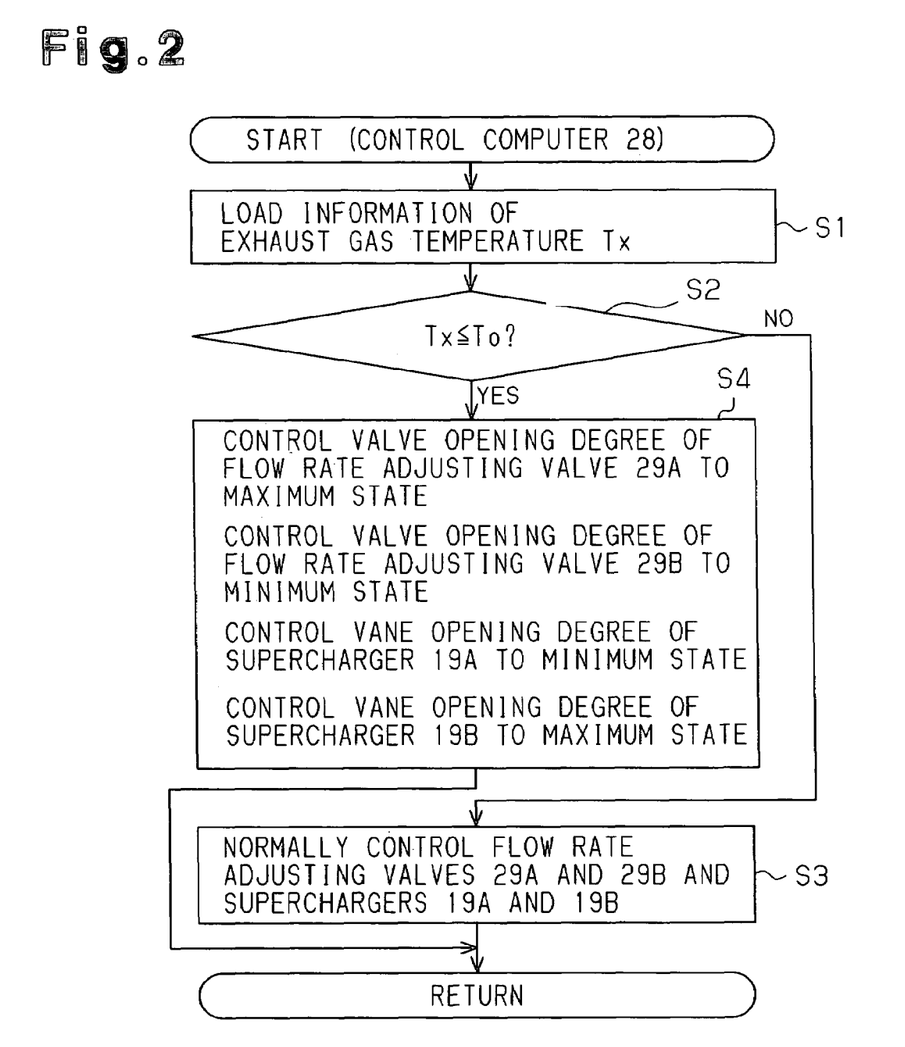
FIG. 2 is a flowchart showing an early activating control program in the apparatus in FIG. 1.

The control computer 28 controls the opening degrees of the vanes provided in the turbine portions 192A and 192B of the superchargers 19A and 19B, and the opening degrees of the flow rate adjusting valves 29A and 29B, on the basis of the early activating control program shown by a flowchart in FIG. 2. A description will be given below of the early activating control on the basis of the flowchart in FIG. 2. The early activating control program shown by the flowchart is repeatedly carried out at a predetermined control cycle.

The control computer 28 loads an information of an exhaust gas temperature Tx detected by the temperature detector 31 at a predetermined control cycle (step S1). The control computer 28 compares the loaded exhaust temperature Tx with a preset threshold value To in magnitude (step S2). In the case that the exhaust temperature Tx is more than the threshold valve To (NO in step S2), the control computer 28 executes a normal control with respect to the superchargers 19A and 19B and the flow rate adjusting valves 29A and 29B (step S3).

The normal control with respect to the superchargers 19A and 19B means the following control. The control computer 28 determines a target supercharging pressure from a preset map on the basis of an engine rotating speed, an engine load or the like. The control computer 28 determines the engine rotating speed from a time change of the crank angle detected by the crank angle detector 27. Further, the control computer 28 determines the engine load, for example, from the fuel injection period (the fuel injection amount) mentioned above. Further, the control computer 28 controls the vane opening degrees in the turbine portions 192A and 192B of the superchargers 19A and 19B in such a manner that the supercharging pressure detected by the pressure detector 30 comes to the target supercharging pressure.

The normal control with respect to the flow rate adjusting valves 29A and 29B means the following control. The control computer 28 controlling the valve opening degrees of the flow rate adjusting valves 29A and 29B determines a necessary intake flow rate based on the fuel injection period (the fuel injection amount) mentioned above, and determines a target supply rate=(exhaust gas supply flow rate)/[(exhaust gas supply flow rate)+(intake flow rate)]. The control computer 28 calculates the valve opening degrees of the flow rate adjusting valves 29A and 29B by using the information of the intake flow rate detected by the air flowmeters 23A and 23B in such a manner that the target supply rate can be obtained. Further, the control computer 28 controls such that the valve opening degrees in the flow rate adjusting valves 29A and 29B comes to the calculated valve opening degree. In the case that the valve opening degrees in the flow rate adjusting valves 29A and 29B are not equal to zero, at least a part of the exhaust gas within the exhaust manifolds 18A and 18B is supplied to the intake manifold 15 via the exhaust gas supply passages 24A and 24B. Accordingly, the combustion temperatures within the combustion chambers in the cylinders 12A and 12B are lowered, and the generation of NOx is reduced.

In the normal control, the vane opening degrees in the superchargers 19A and 19B do not come to the minimum state (the zero opening degree), and the exhaust gas is discharged from both of the exhaust passages 20A and 20B. In this case, the exhaust gas flow rate in the exhaust passage 20A is equal to the exhaust gas flow rate in the exhaust passage 20B.

After the process in step 3, the control computer 28 returns to the process in step 1.

In the case that the exhaust gas temperature Tx is equal to or less than the threshold value To (YES in step S2), the control computer 28 carries out step S4. The control in step S4 corresponds to a control of setting the vane opening degree in the supercharger 19A to the minimum state, setting the vane opening degree in the supercharger 19B to the maximum state, setting the valve opening degree of the flow rate adjusting valve 29A to the maximum state and setting the valve opening degree of the flow rate adjusting valve 29B to the minimum state.

The state in which the vane opening degree in the supercharger 19A is set to the minimum state, and the valve opening degree of the flow rate adjusting valve 29A is set to the maximum state corresponds to a state in which the exhaust gas within the exhaust manifold 18A flows to the branch intake passage 16A via the exhaust gas supply passage 24A without flowing to the exhaust passage 20A. That is, the exhaust gas is discharged only from the exhaust passage 20B. The state in which the vane opening degree in the supercharger 19B is set to the maximum state, and the valve opening degree of the flow rate adjusting valve 29B is set to the minimum state corresponds to a state in which the exhaust gas within the exhaust manifold 18B flows to the exhaust passage 20B without flowing to the exhaust gas supply passage 24B.

After the process in step 4, the control computer 28 returns to the process in step 1.

The exhaust gas supply passage 24A serves as an exhaust gas recirculating path for supplying the exhaust gas to the intake path from the exhaust manifold 18A constituting a part of the first exhaust path. The turbine portion 192A of the supercharger 19A serves as a first exhaust valve adjusting the exhaust flow rate of the exhaust gas discharged from the first exhaust path. The flow rate adjusting valve 29A serves as a first recirculating valve adjusting a supply flow rate of the exhaust gas supplied to the intake path from the first exhaust path via the exhaust gas recirculating path. The turbine portion 192A and the flow rate adjusting valve 29A constitute a flow rate adjusting section adjusting a discharge flow rate of the exhaust gas discharged from the first exhaust path, and a supply flow rate of the exhaust gas supplied to the intake path from the first exhaust path via the exhaust gas recirculating path. The turbine portion 192B of the supercharger 19B serves as a second exhaust valve adjusting the exhaust flow rate of the exhaust gas discharged from the second exhaust path (the exhaust manifold 18B). The flow rate adjusting valve 29B serves as a second recirculating valve adjusting a supply flow rate of the exhaust gas supplied to the intake path from the second exhaust path via the exhaust gas supply passage 24B.

The temperature of the catalyst 25B is estimated to be higher in the case that the exhaust temperature is higher, and to be lower in the case that the exhaust temperature is lower. That is, the detected exhaust gas temperature Tx comes to an information relating to the temperature of the catalyst 25B provided in the second exhaust path. The control computer 28 corresponds to a control section controlling a flow rate adjusting state in the flow rate adjusting section on the basis of the information of the exhaust gas temperature. The flow rate adjusting state in the flow rate adjusting section in this case corresponds to an adjusting state of a magnitude of the vane opening degree in the turbine portion 192A, and an adjusting state of a magnitude of the valve opening degree in the flow rate adjusting valve 29A.

The first embodiment has the following advantages.

(1-1) The more the flow rate of the exhaust gas passing through the catalyst 25A or 25B is, the earlier the temperature in the corresponding catalyst 25A or 25B rises, so that the temperature in the corresponding catalyst 25A or 25B early reaches a temperature suitable for purifying the exhaust gas. That is, the corresponding catalyst 25A or 25B is early activated.

It is assumed that the exhaust temperature Tx detected by the temperature detector 31 exists in a low temperature region equal to or less than the threshold value To. In this case, the present embodiment reduces the exhaust gas flowing to the intake path from the exhaust gas supply passage 24B as much as possible, and increases the exhaust gas flowing to the catalyst 25B from the exhaust passage 20B, by supplying a total amount or most of the exhaust gas to be supplied to the intake path via the exhaust gas recirculating path to the intake path via the exhaust gas supply passage 24A. For example, there is exemplified an engine operating state in which a ratio between the exhaust gas flowing in the downstream side of the exhaust path and the exhaust gas flowing in the exhaust gas recirculating path is 50:50. If the exhaust gas temperature Tx is higher than the threshold value To, the ratio between the exhaust gases flowing through the exhaust passage 20A and the exhaust passage 20B comes to 50:50. On the other hand, if the exhaust gas temperature Tx is lower than the threshold value To, the ratio between the exhaust gas flowing through the exhaust passage 20A and the exhaust passage 20B comes to 0:100. At this time, the exhaust gas is prevented from being discharged from the exhaust passage 20A by setting the vane opening degree of the turbine portion 192A of the supercharger 19A to the minimum state. Further, as a matter of convenience of a warm-up, a load or the like of the engine, there can be formed an engine operating state in which the ratio of the exhaust gas flowing through the exhaust gas recirculating path is not increased so much, for example, an engine operating state in which the ratio between the exhaust gas flowing in the downstream side of the exhaust path and the exhaust gas flowing through the exhaust gas recirculating path comes to 70:30. In this case, if the exhaust gas temperature Tx is lower than the threshold value To, the ratio between the exhaust gases flowing through the exhaust passage 20A and the exhaust passage 20B comes to 40:100.

The control computer 28 controls the flow rate adjusting state in the flow rate adjusting section in such a manner that the discharge ratio of the exhaust passage 20A with respect to the exhaust passage 20B in the case that the exhaust gas temperature Tx exists in the low temperature region becomes smaller than the discharge ratio of the exhaust passage 20A with respect to the exhaust passage 20B in the case that the exhaust temperature Tx does not exist in the low temperature region. Accordingly, the catalyst 25B provided in the exhaust passage 20B is early activated.

In the state in which the all or most of the exhaust gas is discharged from the exhaust passage 20B, it is necessary to circulate the exhaust gas within the exhaust manifold 18A through the exhaust passage 20B. Reducing the amount of the exhaust gas flowing through the exhaust gas supply passage 24B from the inner side of the exhaust manifold 18B as well as increasing the amount of the exhaust gas flowing through the exhaust gas supply passage 24A from the inner side of the exhaust manifold 18A achieves substantially the same operation as circulating the exhaust gas within the exhaust manifold 18A through the exhaust passage 20B.

In the internal combustion engine provided with the structure of supplying the exhaust gas to the intake path so as to contribute to the purification of the exhaust gas, that is, the exhaust gas supply passages 24A and 24B and the flow rate adjusting valves 29A and 29B, a new mechanism for supplying the exhaust gas to the intake path is not required. Accordingly, in the internal combustion engine designed such as to be provided with the exhaust gas supply passages 24A and 24B and the flow rate adjusting valves 29A and 29B, it is possible to achieve an early activation in the catalyst 25B in a pair of catalysts 25A and 25B, without adding any new mechanism for supplying the exhaust gas to the intake path.

(1-2) In the present embodiment, the exhaust gas is prevented from being discharged from the exhaust passage 20A, by setting the vane opening degree in the turbine portion 192A of the supercharger 19A to the minimum state. In the internal combustion engine provided with the superchargers 19A and 19B, a new mechanism for preventing the exhaust gas from being discharged from the exhaust passage 20A is not required. Accordingly, in the internal combustion engine designed such as to be provided with the superchargers 19A and 19B, it is possible to achieve an early activation in the catalyst 25B in a pair of catalysts 25A and 25B, without adding any new mechanism for preventing the exhaust gas from being discharged from the exhaust passage 20A.

(1-3) In the case that the exhaust temperature Tx exists in the low temperature region equal to or less than the threshold value To, all or most of the exhaust gas is discharged from the exhaust passage 20B. Accordingly, in the case that the exhaust gas temperature Tx exists in the low temperature region equal to or less than the threshold value To, all or most of the exhaust gas can be utilized for the early activation in the catalyst 25B. This is preferable for the early activation in the catalyst 25B.

(1-4) If the temperature of the catalyst 25B is higher in the case that the exhaust gas temperature is higher, and is lower in the case that the exhaust gas temperature is lower, it is assumed to be accurate. That is, the exhaust gas temperature Tx detected by the temperature detector 31 accurately reflects the temperature of the catalyst 25B. Accordingly, the exhaust gas temperature Tx detected by the temperature detector 31 is preferable as the information relating to the temperature of the catalyst provided in the second exhaust path.

Next, a description will be given of a second embodiment in accordance with the present invention shown in FIGS. 3 and 4. The same reference numerals are used in the same structure portions as those of the first embodiment.

Figure 4:
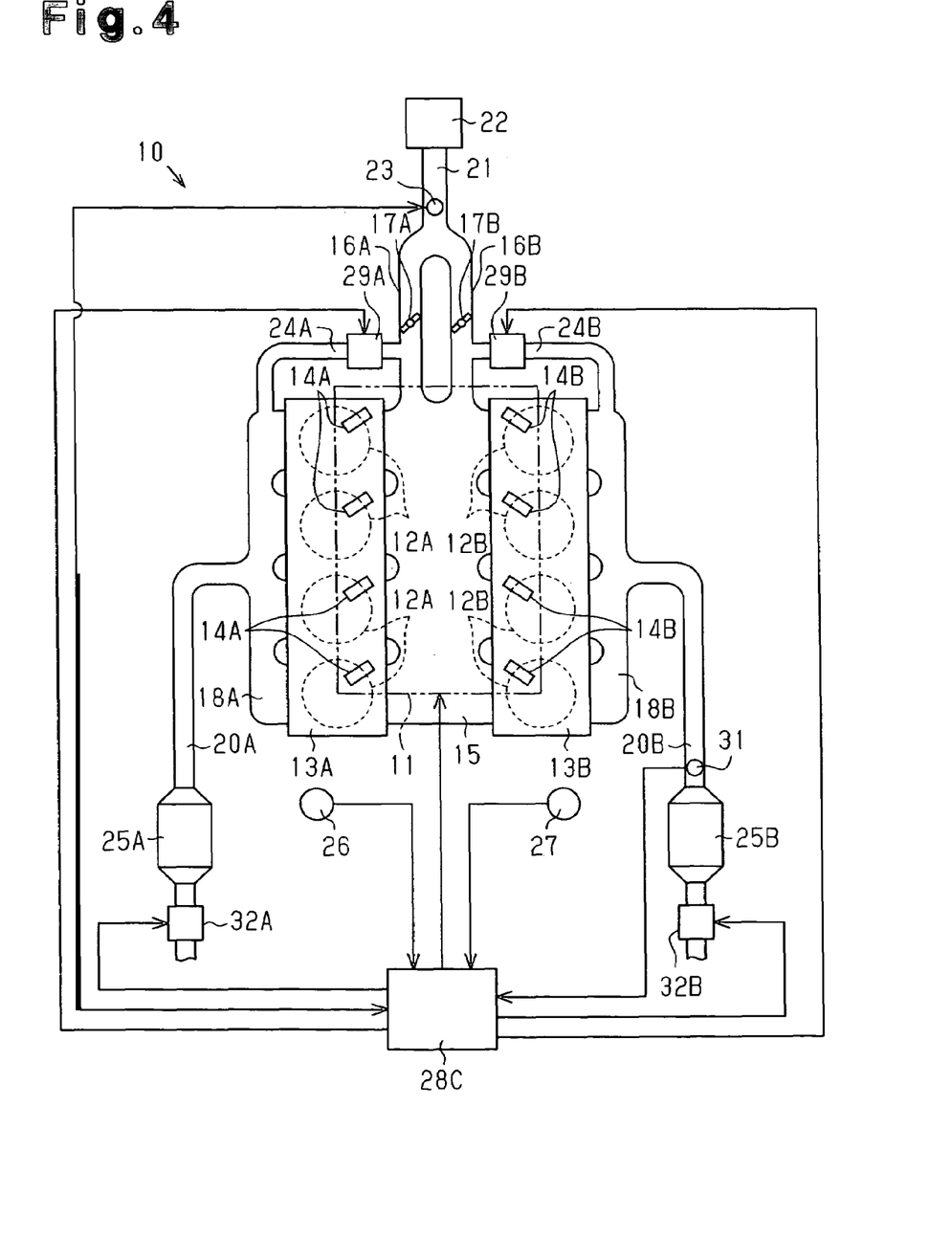
FIG. 4 is a general diagram of an exhaust gas purifying apparatus executing the program in FIG. 3.

As shown in FIG. 4, the second embodiment is different from the first embodiment in points that the supercharger is not provided, and the exhaust throttle valves 32A and 32B are provided in the portion of the exhaust passages 20A and 20B in the downstream side of the catalysts 25A and 25B. The single air flowmeter 23 is provided in the main intake passage 21.

Figure 3:
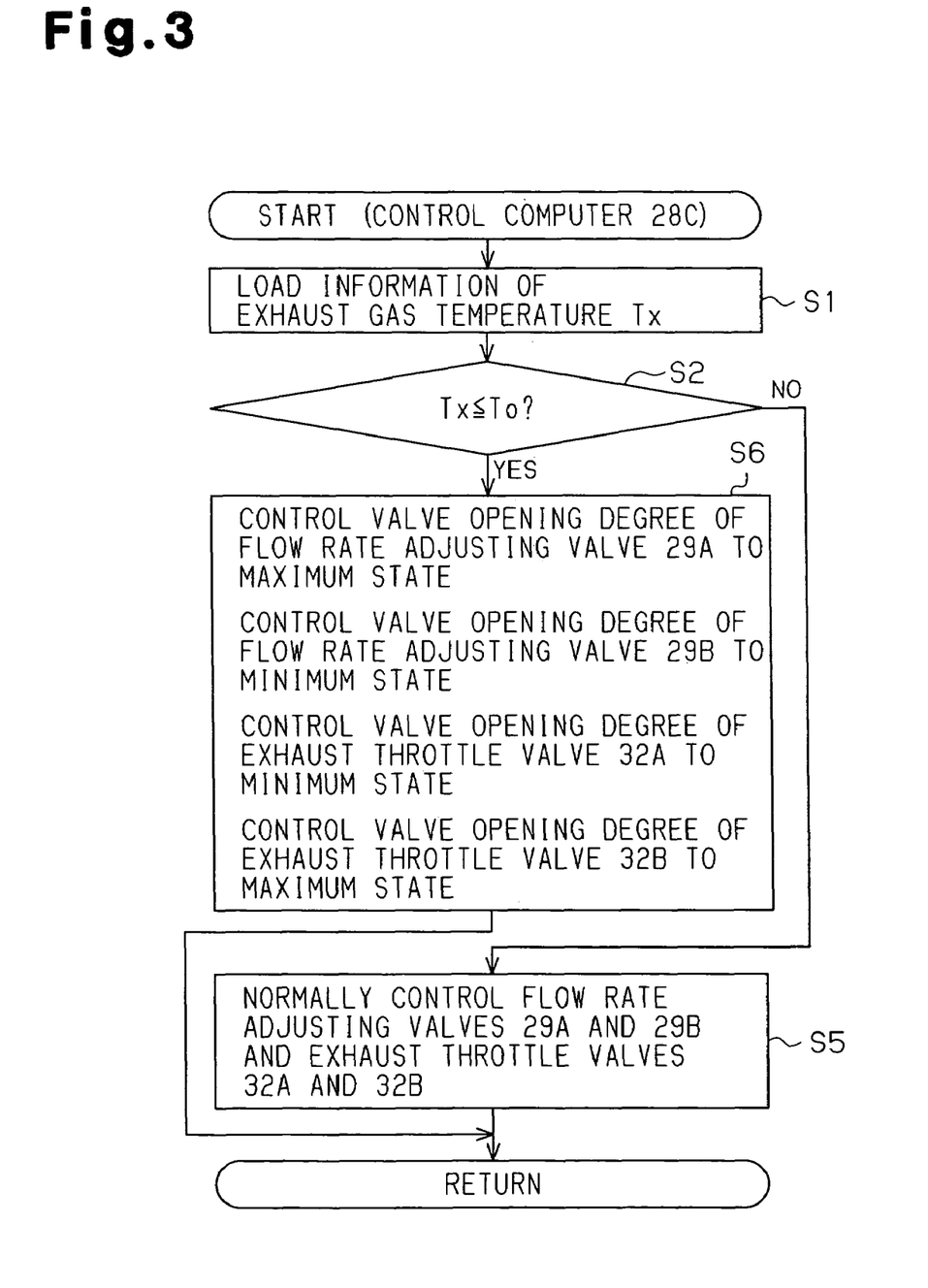
FIG. 3 is a flowchart showing an early activating control program according to a second embodiment of the present invention.

A control computer 28C in the second embodiment controls the valve opening degrees in the exhaust throttle valves 32A and 32B and the vale opening degrees in the flow rate adjusting valves 29A and 29B on the basis of an early activation control program shown by a flowchart in FIG. 3. The control computer 28C controls the valve opening degrees of the exhaust throttle valves 32A and 32B, for example, on the basis of brake pedal operation information obtained from a sensor detecting a depression degree of a brake pedal (not shown). In the present embodiment, the minimum state of the valve openings of the exhaust throttle valves 32A and 32B corresponds to a state in which the exhaust gas can not pass through the exhaust throttle valves 32A and 32B.

The early activation control program in the second embodiment is different from the first embodiment only in a point that steps S5 and S6 are carried out in place of steps S3 and S4 in the early activation control program in accordance with the first embodiment. A description will be given below only of the different steps S5 and S6.

In the case of NO in step S2 (in the case that the exhaust gas temperature Tx does not exist in the low temperature region equal to or less than the threshold valve To), the control computer 28C executes a normal control with respect to the exhaust throttle valves 32A and 32B and the flow rate adjusting valves 29A and 29B (step S5).

The normal control with respect to the exhaust throttle valves 32A and 32B means the following control. If the depressing operation of the brake pedal mentioned above is executed, the control computer 28C executes a control of making the valve opening degrees of the exhaust throttle valves 32A and 32B small. Accordingly, the exhaust resistance in the exhaust passages 20A and 20B is increased, and the exhaust resistance increases an engine load so as to be applied as a braking operation to the vehicle. The normal control with respect to the flow rate adjusting valves 29A and 29B is the same as the case of the first embodiment.

In the normal control with respect to the exhaust throttle valves 32A and 32B, the valve opening degrees of the exhaust throttle valves 32A and 32B do not come to zero opening degree, but the exhaust gas is discharged from both of the exhaust passages 20A and 20B. In this case, the exhaust gas flow rate in the exhaust passage 20A is the same as the exhaust gas flow rate in the exhaust passage 20B.

In the case of YES in step S2 (in the case that the exhaust gas temperature Tx exists in the low temperature region equal to or less than the threshold valve To), the control computer 28C carries out step S6. The control in step S6 means a control setting the valve opening degree in the exhaust throttle valve 32B to the maximum state as well as setting the valve opening degree in the exhaust throttle valve 32A to the minimum state, and setting the valve opening degree of the flow rate adjusting valve 29B to the minimum state as well as setting the valve opening degree of the flow rate adjusting valve 29A to the maximum state.

The state in which the valve opening degree in the exhaust throttle valve 32A is set to the minimum state, and the valve opening degree of the flow rate adjusting valve 29A is set to the maximum state means a state in which the exhaust gas within the exhaust manifold 18A flows to the branch intake passage 16A via the exhaust gas supply passage 24A without flowing to the exhaust passage 20A. That is, the exhaust gas is discharged only from the exhaust passage 20B. The state in which the valve opening degree in the exhaust throttle valve 32B is set to the maximum state, and the valve opening degree of the flow rate adjusting valve 29B is set to the minimum state means a state in which the exhaust gas within the exhaust manifold 18B flows to the exhaust passage 20B without flowing to the exhaust gas supply passage 24B.

The exhaust throttle valve 32A adjusts the discharge flow rate of the exhaust gas discharged from the first exhaust path (the exhaust manifold 18A and the exhaust passage 20A). The flow rate adjusting valve 29A adjusts the supply flow rate of the exhaust gas supplied to the intake path from the first exhaust path via the exhaust gas recirculating path. The exhaust throttle valve 32A and the flow rate adjusting valve 29A constitute the flow rate adjusting section adjusting the exhaust flow rate of the exhaust gas discharged from the first exhaust path and the supply flow rate of the exhaust gas supplied to the intake path from the first exhaust path via the exhaust gas recirculating path. The control computer 28C corresponds to a control section controlling a flow rate adjusting state in the flow rate adjusting section on the basis of the information (the detected exhaust temperature Tx) of the exhaust temperature. The flow rate adjusting state in the flow rate adjusting section in this case means an adjusting state of a magnitude of the valve opening degree in the exhaust throttle valve 32A, and an adjusting state of a magnitude of the valve opening degree in the flow rate adjusting valve 29A.

The second embodiment has the same advantages as the items (1-1) and (1-3) in the first embodiment.

In the second embodiment, the exhaust gas is prevented from being discharged from the exhaust passage 20A by setting the valve opening degree of the exhaust throttle valve 32A to the minimum state. In the vehicle provided with the exhaust throttle valves 32A and 32B, a new mechanism for preventing the exhaust gas from being discharged from the exhaust passage 20A is not required. Accordingly, in the vehicle designed such that the exhaust throttle valves 32A and 32B are provided for assisting the braking, it is possible to achieve an early activation in the catalyst 25B in a pair of catalysts 25A and 25B without adding any new mechanism for preventing the exhaust gas from being discharged from the exhaust passage 20A.

Next, a description will be given of a third embodiment in accordance with the present invention with reference to FIGS. 5 and 6. The same reference numerals are attached to the same structure portions as those of the first embodiment.

Figure 5:
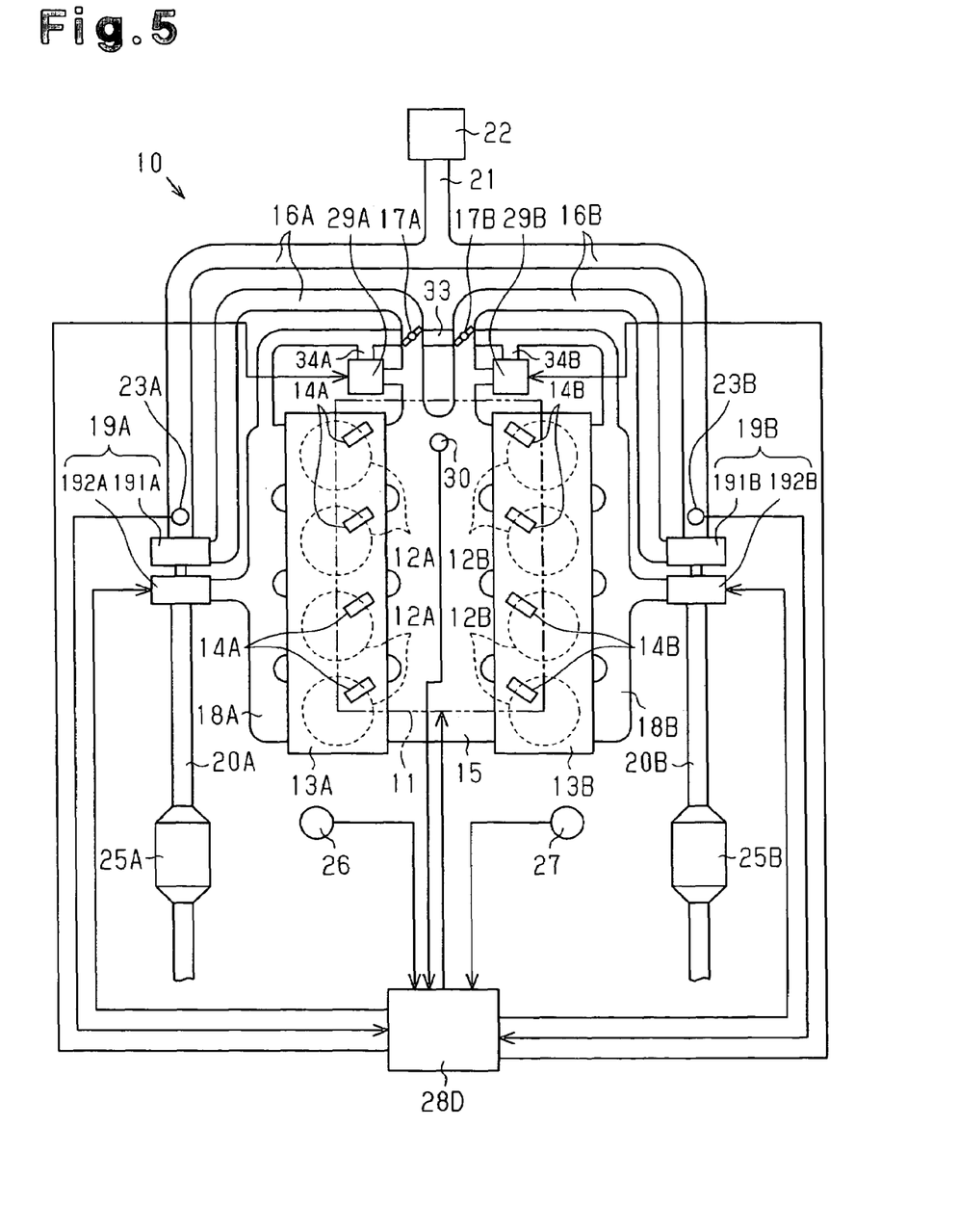
FIG. 5 is a general diagram of an exhaust gas purifying apparatus according to a third embodiment of the present invention.

As shown in FIG. 5, in the third embodiment, the exhaust manifolds 18A and 18B are connected by a communication passage 33. The communication passage 33 and the branch intake passage 16A are connected by a branch passage 34A, and the flow rate adjusting valve 29A is interposed in the branch passage 34A. The communication passage 33 and the branch intake passage 16B are connected by a branch passage 34B, and the flow rate adjusting valve 29B is interposed in the branch passage 34B. In this case, in the third embodiment, the temperature detector 31 in the first embodiment is not used.

The communication passage 33 contributes to suppression of generation of pulsation and dissolving of uneven distribution in the case that the exhaust gas is supplied to the single intake manifold 15 from a pair of exhaust manifolds 18A and 18B.

Figure 6:
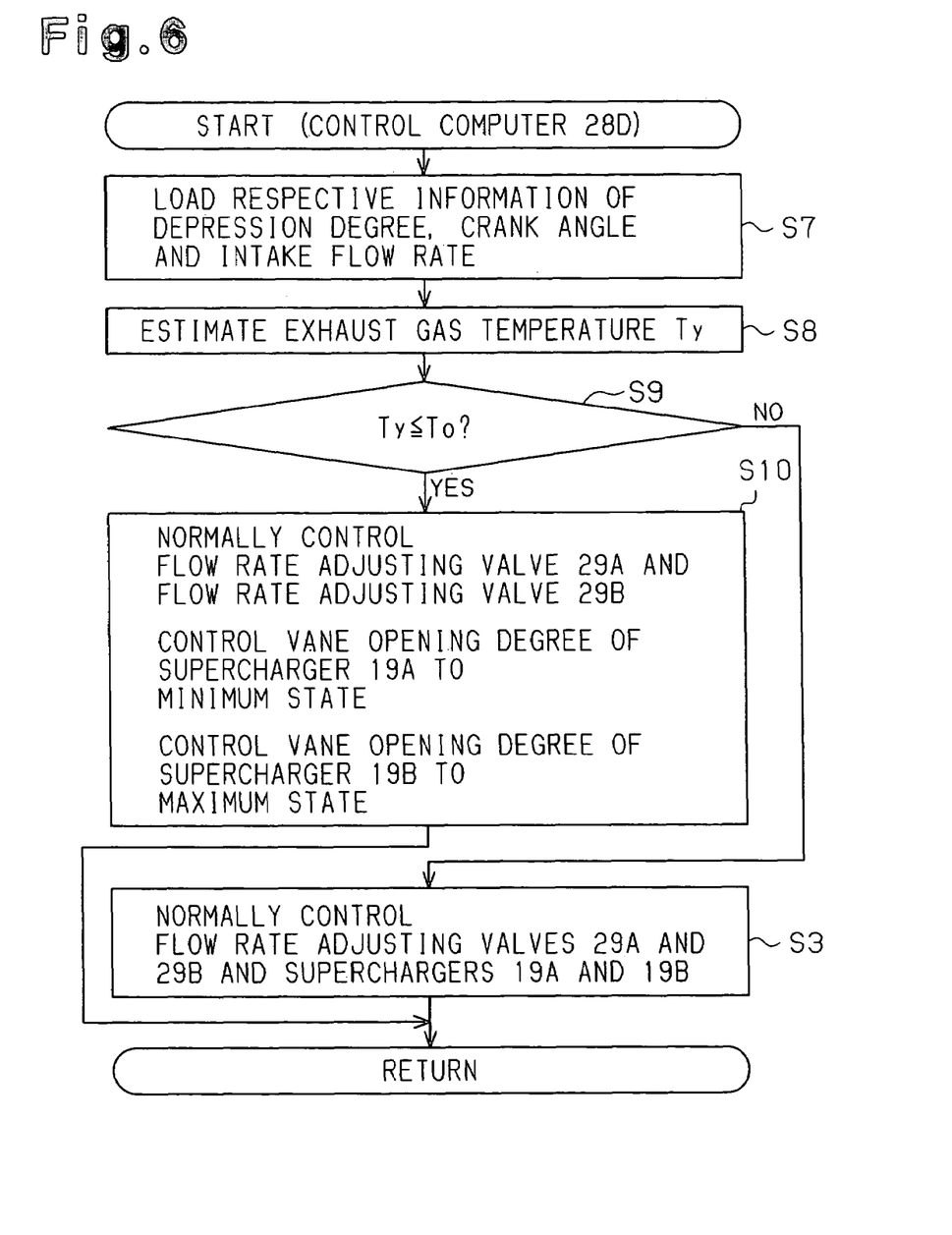
FIG. 6 is a flowchart showing an early activating control program in the apparatus in FIG. 5.

A control computer 28D in the third embodiment controls the vane opening degrees in the superchargers 19A and 19B, and the valve opening degrees in the flow rate adjusting valves 29A and 29B, on the basis of an early activation control program shown by a flowchart in FIG. 6. The early activation control program in the third embodiment is different from the first embodiment only in a point that steps S7, S8, S9 and S10 are carried out in place of steps S1 and S2 in the early activation control program in the first embodiment. A description will be given below of these different steps S7 to S10.

The control computer 28D loads the information of the depression degree detected by the accelerator pedal position detector 26, the crank angle degree detected by the crank angle detector 27 and the intake flow rate detected by the air flowmeters 23A and 23B at a predetermined control cycle (step S7). The control computer 28D calculates the engine rotating speed on the basis of the crank angle detection information obtained by the crank angle detector 27. The control computer 28D calculates and controls the fuel injection period (the injection start timing and the injection end timing) in the fuel injection nozzles 14A and 14B on the basis of the depression degree detection information and the crank angle detection information. Further, the control computer 28D estimates an exhaust gas temperature Ty in the exhaust passages 20A and 20B on the basis of the information of the calculated engine rotating speed, the information of the fuel injection period, information of the intake flow rate obtained by the air flowmeters 23A and 23B, and the like (step S8).

The control computer 28D compares the estimated exhaust gas temperature Ty with the preset threshold value To in magnitude (step S9). In the case that the exhaust temperature Ty is more than the threshold value To (NO in step S9), the control computer 28D executes the normal control with respect to the superchargers 19A and 19B and the flow rate adjusting valves 29A and 29B (step S3).

In the case that the exhaust gas temperature Ty is equal to or less than the threshold value To (YES in step S9), the control computer 28D carries out step S10. The control in step S10 corresponds to a control setting the vane opening degree in the supercharger 19A to the minimum state, and setting the vane opening degree in the supercharger 19B to the maximum state, and the flow rate adjusting valves 29A and 29B are normally controlled.

In the case that the estimated exhaust gas temperature Ty exists in the low temperature region equal to or less than the threshold value To, the valve opening degrees of the flow rate adjusting valves 29A and 29B are set to be in the minimum state (zero opening degree). At this time, the exhaust gas in the exhaust manifold 18A is supplied to the exhaust manifold 18B via the communication passage 33. Further, in the case that the estimated exhaust gas temperature Ty exists in the low temperature region equal to or less than the threshold value To, the valve opening degrees of the flow rate adjusting valves 29A and 29B are set to be out of the minimum state (zero opening degree). At this time, the exhaust gas in the exhaust manifold 18A is supplied to the exhaust manifold 18B via the communication passage 33, and is also supplied to the branch intake passages 16A and 16B via the branch passages 34A and 34B and the flow rate adjusting valves 29A and 29B. That is, in the case that the estimated exhaust gas temperature Ty exists in the low temperature region equal to or less than the threshold value To, all the exhaust gases are discharged from the exhaust passage 20B.

The communication passage 33 and the branch passage 34A constitute an exhaust gas recirculating path for supplying the exhaust gas from the exhaust manifold 18A constituting a part of the first exhaust path to the intake path. The estimated exhaust gas temperature Ty comes to the information of the temperature of the catalyst 25B provided in the second exhaust path. The control computer 28D corresponds to the control section controlling the flow rate adjusting state in the flow rate adjusting section on the basis of the information (the estimated exhaust gas temperature Ty) of the exhaust gas temperature.

In the third embodiment, in the internal combustion engine designed such as to be provided with the communication passage 33, the branch passages 34A and 34B and the flow rate adjusting valves 29A and 29B, it is possible to achieve an early activation in the catalyst 25B in a pair of catalysts 25A and 25B without adding any new mechanism for supplying the exhaust gas to the intake path.

Further, in the third embodiment, it is possible to obtain the same effects as the items (1-2) and (1-3) in the first embodiment. Further, the third embodiment has an advantage that the normal control can be executed with respect to the flow rate adjusting valves 29A and 29B even in the case that the estimated exhaust gas temperature Ty exists in the low temperature region equal to or less than the threshold value To.

The present invention may be embodied in the following configurations.

Figure 7:
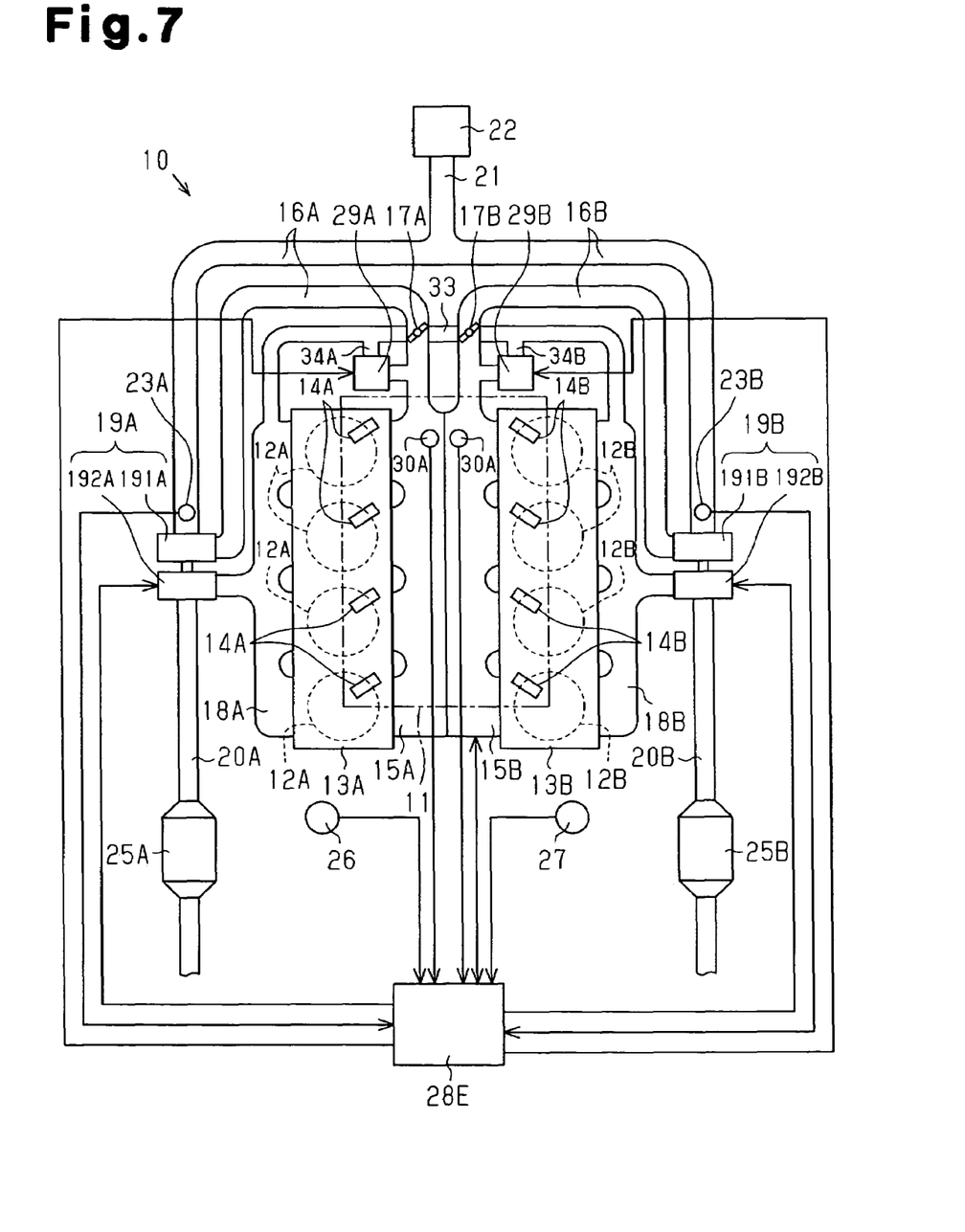
FIG. 7 is a general diagram of an exhaust gas purifying apparatus according to a fourth embodiment of the present invention.

(1) In a fourth embodiment shown in FIG. 7, an intake manifold 15A communicating with the cylinders 12A, and an intake manifold 15B communicating with the cylinders 12B are independently provided. The same reference numerals are used in the same structure portions as those of the third embodiment. The branch intake passage 16A is connected to the intake manifold 15A, and the branch intake passage 16B is connected to the intake manifold 15B. Pressure detectors 30A and 30B for detecting the supercharging pressure are respectively provided within the intake manifolds 15A and 15B.

A control computer 28E controls the vane opening degrees in the turbine portions 192A and 192B of the superchargers 19A and 19B in such a manner that the supercharging pressure detected by the pressure detectors 30A and 30B come to a target supercharging pressure. Further, the control computer 28E controls the vane opening degrees in the superchargers 19A and 19B and the valve opening degrees of the flow rate adjusting valves 29A and 29B on the basis of the estimated exhaust gas temperature Ty, in the same manner as the case of the third embodiment.

Further, the control computer 28E executes the control of early activating the catalyst 25B in the same manner as the case of the third embodiment, in the case that the estimated exhaust gas temperature Ty is equal to or less than the threshold value To.

Figure 8:
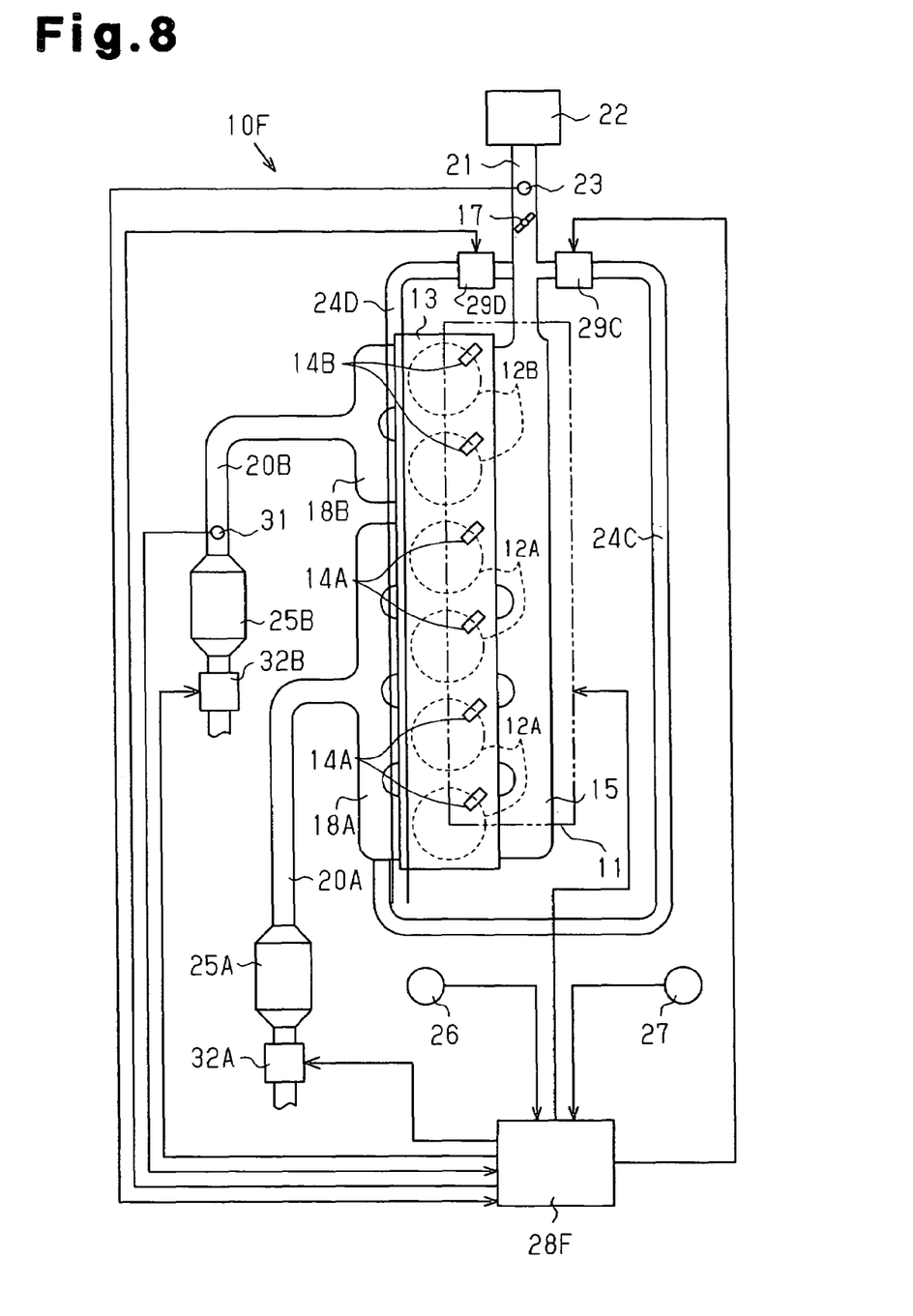
FIG. 8 is a general diagram of an exhaust gas purifying apparatus according to a fifth embodiment of the present invention.

(2) FIG. 8 illustrates a fifth embodiment. In an internal combustion engine 10F in accordance with the fifth embodiment, the exhaust manifold 18A is communicated with four cylinders 12A, and the exhaust manifold 18B is communicated with two cylinders 12B. The exhaust manifold 18A and the main intake passage 21 are connected via an exhaust gas supply passage 24C, and a flow rate adjusting valve 29C is interposed in the exhaust gas supply passage 24C. The exhaust manifold 18B and the main intake passage 21 are connected via an exhaust gas supply passage 24D, and a flow rate adjusting valve 29D is interposed in the exhaust gas supply passage 24D. Reference numeral 13 denotes a cylinder head, reference numeral 17 denotes a throttle valve, and reference numeral 11 denotes a fuel injection apparatus including the fuel injection nozzles 14A and 14B. The temperature detector 31 detects the exhaust gas temperature within the exhaust passage 20B.

A control computer 28F controls the valve opening degrees of the exhaust throttle valves 32A and 32B and the valve opening degrees of the flow rate adjusting valves 29C and 29D. Further, the control computer 28F sets the valve opening degree of the exhaust throttle valve 32A to the minimum state and sets the valve opening degree of the flow rate adjusting valve 29C to the maximum state, in the case that the detected exhaust gas temperature Tx is equal to or less than the threshold value To. In this state, the exhaust gas within the exhaust manifold 18A is supplied to the intake manifold 15 via the exhaust gas supply passage 24C and the main intake passage 21, and the exhaust gas is discharged only from the exhaust passage 20B. That is, the control computer 28F executes a control of early activating the catalyst 25B, in the case that the detected exhaust gas temperature Tx is equal to or less than the threshold value To.

In the case that the exhaust gas temperature Tx does not exist in the low temperature region equal to or less than the threshold value To, a ratio between the discharge flow rate of the exhaust gas discharged from the exhaust passage 20A and the discharge flow rate of the exhaust gas discharged from the exhaust passage 20B comes to 2:1.

In the fifth embodiment, the exhaust manifold 18A and the exhaust passage 20A constitute the first exhaust path, and the exhaust manifold 18B and the exhaust passage 20B constitute the second exhaust path.

(3) In the third embodiment, it is possible to do away with any one of the set of the flow rate adjusting valve 29A and the branch passage 34A, and the set of the flow rate adjusting valve 29B and the branch passage 34B.

(4) In the first, third, and fourth embodiments, it is possible to employ a supercharger in which the minimum state of the vane opening degree in the supercharger does not come to the zero opening degree. In this case, in the case that the exhaust gas temperature exists in the low temperature region, the exhaust gas is mainly discharged from the exhaust passage 20B, however, is discharged from the exhaust passage 20A to some extent.

(5) In the second and fifth embodiments, it is possible to employ an exhaust throttle valve in which the minimum state of the valve opening degree in the exhaust throttle valve does not come to the zero opening degree. In this case, in the case that the exhaust gas temperature exists in the low temperature region, the exhaust gas is mainly discharged from the exhaust passage 20B, however, is discharged from the exhaust passage 20A to some extent.

(6) In the first to fourth embodiments, it is possible to employ a catalyst which has a small size and tends to rise temperature as the catalyst 25B, and it is possible to employ a catalyst which has a large size and has a small exhaust resistance as the catalyst 25A. In this case, in the case that the exhaust temperature exists in the low temperature region, all or most of the exhaust gas is discharged from the exhaust passage 20B. In accordance with this structure, it is possible to further earlier execute the activation in the catalyst 25B than in the case of the first to fourth embodiments. Further, the exhaust resistance at a time when the exhaust temperature does not exist in the low temperature region, and the engine is in the high output state is reduced, and the engine output performance is improved.

(7) In the early activation control programs in the first to third embodiments, it is possible to employ a detected temperature of a cooling water for cooling the internal combustion engine 10 in place of the detected exhaust gas temperature Tx or the estimated exhaust gas temperature Ty. The detected temperature of the cooling water can be utilized as the information of the temperature of the catalyst provided in the first exhaust path, by assuming that the exhaust gas temperature is higher in the case that the temperature of the cooling water is higher, and the exhaust temperature is lower in the case that the temperature of the cooling water is lower. In this case, it is preferable to use a threshold value Tw expected to generate the exhaust gas temperature expressed as the threshold value To in the first to third embodiments as a compared subject of the detected temperature of the cooling water.

(8) In the early activation control programs in the first to third embodiments, it is possible to employ a threshold value Fo of the engine load in place of the detected exhaust gas temperature Tx or the estimated exhaust gas temperature Ty. The engine load can be utilized as the information of the temperature of the catalyst provided in the first exhaust path, by assuming that the exhaust gas temperature is higher in the case that the engine load is higher, and the exhaust gas temperature is lower in the case that the engine load is lower. In this case, it is preferable to use a threshold value Fo expected to generate the exhaust gas temperature expressed as the threshold value To in the first to third embodiments as a compared subject of the detected engine load.

(9) It is possible to directly detect the temperature of the catalyst 25B in place of detecting the exhaust gas temperature within the exhaust passage 20B.

(10) The present invention may be applied to the exhaust gas purifying apparatus in the internal combustion engine in which three or more exhaust paths are provided in parallel. In this case, in the case that the exhaust gas temperature exists in the low temperature region, it is preferable to discharge the exhaust gas from only one of these three exhaust paths, or it is preferable to discharge the exhaust gas from two of these three exhaust paths. In the structure in which the exhaust gas is discharged from only one of these three exhaust paths, two exhaust paths which do not discharge the exhaust gas in the case that the exhaust temperature exists in the low temperature region form the first exhaust path, and the remaining one forms the second exhaust path. In the structure in which the exhaust gas is discharged form two of these three exhaust paths, the one exhaust path which does not discharge the exhaust gas in the case that the exhaust gas temperature exists in the low temperature region forms the first exhaust path, and the remaining two form the other exhaust paths (the other exhaust paths than the first exhaust path).

(11) In the first embodiment, there is shown the nitrogen oxide occlusion reducing type catalyst carried in the particulate filter of the diesel engine, however, the kind of the catalyst may employ a simple oxidation catalyst. Alternatively, the present invention may be applied to a gasoline engine having a three-way catalyst. In order to permit the catalyst to sufficiently function, it is generally necessary to heat the catalyst utilized for purifying the exhaust gas to a temperature equal to or greater than a fixed value. The kinds of the engine and the catalyst are not limited.

What is claimed is:

1. An exhaust gas purifying apparatus in an internal combustion engine provided with an intake path, and a plurality of parallel exhaust paths including at least first and second exhaust paths, the apparatus comprising:
    catalysts respectively arranged in the plurality of exhaust paths for purifying unclean substances contained in exhaust gas;
    a first exhaust gas recirculating path for supplying the exhaust gas from the first exhaust path to the intake path;
    a second exhaust gas recirculating path for supplying the exhaust gas from the second exhaust path to the intake path;
    an exhaust flow rate adjusting section adjusting a flow rate of the exhaust gas discharged from the first exhaust path to a downstream side;
    a supply flow rate adjusting section adjusting a flow rate of the exhaust gas supplied to the intake path from the first exhaust path via the first exhaust gas recirculating path; and
    a control section controlling an opening degree of the exhaust flow rate adjusting section and an opening degree of the supply flow rate adjusting section on the basis of information relating to the temperature of at least one of the catalysts, wherein the control section decreases the opening degree of the exhaust flow rate adjusting section and increases the opening degree of the supply flow rate adjusting section in such a manner that a ratio of the flow rate of the exhaust gas discharged from the first exhaust path with respect to the flow rate of the exhaust gas discharged from the other exhaust paths than the first exhaust path becomes smaller in a case that the temperature of the catalyst arranged in the other exhaust paths exists in a preset low temperature region than in other cases.

2. An exhaust gas purifying apparatus in an internal combustion engine provided with an intake path, and parallel first and second exhaust paths, the apparatus comprising:

catalysts respectively arranged in the first and second exhaust paths for purifying exhaust gas;

a first exhaust gas recirculating path for supplying the exhaust gas from the first exhaust path to the intake path;

a second exhaust gas recirculating path for supplying the exhaust gas from the second exhaust path to the intake path;

an exhaust flow rate adjusting section adjusting a flow rate of the exhaust gas discharged from the first exhaust path to a downstream side;

a supply flow rate adjusting section adjusting a flow rate of the exhaust gas supplied to the intake path from the first exhaust path via the first exhaust gas recirculating path; and a control section controlling an opening degree of the exhaust flow rate adjusting section and an opening degree of the supply flow rate adjusting section on the basis of an information relating to the temperature of at least one of the catalysts, wherein the control section decreases the opening degree of the exhaust flow rate adjusting section and increases the opening degree of the supply flow rate adjusting section in such a manner that a ratio of the flow rate of the exhaust gas discharged from the first exhaust path with respect to the flow rate of the exhaust gas discharged from the second exhaust path becomes smaller in a case that the temperature of the catalyst arranged in the second exhaust path exists in a preset low temperature region than in other cases.

3. The exhaust gas purifying apparatus according to claim 1, further comprising a variable nozzle type turbocharger supplying air by utilizing an exhaust gas flow, the turbocharger including a turbine portion provided at the first exhaust path, wherein the exhaust flow rate adjusting section is provided with the turbine portion, wherein the supply flow rate adjusting section is provided with a flow rate adjusting valve adjusting a flow rate in the first exhaust gas recirculating path, wherein the first exhaust gas recirculating path is connected to a portion of the first exhaust path in an upstream side of the turbine portion, and wherein the control section controls an opening degree of a vane provided in the turbine portion, and an opening degree of the flow rate adjusting valve.

4. The exhaust gas purifying apparatus according to claim 1, further comprising an exhaust throttle valve provided in a portion of the first exhaust path in a downstream side of a joint portion between the first exhaust gas recirculating path and the first exhaust path, wherein the exhaust flow rate adjusting section is provided with the exhaust throttle valve, wherein the supply flow rate adjusting section is provided with a flow rate adjusting valve adjusting a flow rate in the first exhaust gas recirculating path, and wherein the control section controls an opening degree of the exhaust throttle valve, and an opening degree of the flow rate adjusting valve.

5. The exhaust gas purifying apparatus according to claim 2, wherein the exhaust flow rate adjusting section is provided with a first exhaust valve provided in a portion of the first exhaust path in a downstream side of a joint portion between the first exhaust gas recirculating path and the first exhaust path, and a second exhaust valve provided in a portion of the second exhaust path in a downstream side of a joint portion between the second exhaust gas recirculating path and the second exhaust path, and wherein, in the case that the temperature of the catalyst arranged in the second exhaust path exists in the low temperature region, the control section minimizes an opening degree of the first exhaust valve and maximizes an opening degree of the second exhaust valve.

6. The exhaust gas purifying apparatus according to claim 2, wherein the supply flow rate adjusting section is provided with a first recirculating valve provided in the first exhaust gas recirculating path, and a second recirculating valve provided in the second exhaust gas recirculating path, and wherein, in the case that the temperature of the catalyst arranged in the second exhaust path exists in the low temperature region, the control section maximizes an opening degree of the first recirculating valve and minimizes an opening degree of the second recirculating valve.

7. The exhaust gas purifying apparatus according to claim 1, wherein the control section controls the exhaust flow rate adjusting section in such a manner that the exhaust gas is not discharged from the first exhaust path in the case that the temperature of the catalyst arranged in the other exhaust path exists in the low temperature region.

8. The exhaust gas purifying apparatus according to claim 1, wherein that the information relating to the temperature of the catalyst includes an exhaust gas temperature detected by a temperature detector.

9. An exhaust gas purifying method in an internal combustion engine provided with an intake path and parallel first and second exhaust paths, the method comprising:

purifying exhaust gas discharged from the first and second exhaust paths by catalysts respectively provided in the first and second exhaust paths;

recirculating the exhaust gas to the intake path from the first exhaust path;

recirculating the exhaust gas to the intake path from the second exhaust path;

providing exhaust gas discharged from the first exhaust path to a downstream side;

providing exhaust gas supplied to the intake path from the first exhaust path;

acquiring information relating to a temperature of at least one of the catalysts; and decreasing a flow rate of the exhaust gas discharged to the downstream side from the first exhaust path and increasing a flow rate of the exhaust gas recirculated to the intake path from the first exhaust path based on said temperature information in such a manner that a ratio of the flow rate of the exhaust gas discharged from the first exhaust path with respect to the flow rate of the exhaust gas discharged from the second exhaust path becomes smaller in the case that the temperature of the catalyst arranged in the second exhaust path exists in a preset low temperature region than in other cases.

10. The exhaust gas purifying method according to claim 9, wherein a first exhaust valve is provided in the first exhaust path, a second exhaust valve is provided in the second exhaust path, a first recirculating valve is provided in a first exhaust gas recirculating path recirculating the exhaust gas to the intake path from the first exhaust path, and a second recirculating valve is provided in a second exhaust gas recirculating path recirculating the exhaust gas to the intake path from the second exhaust path, and wherein the method further comprises minimizing the opening degrees of the first exhaust valve and the second recirculating valve and maximizing the opening degrees of the second exhaust valve and the first recirculating valve.

11. The exhaust gas purifying apparatus according to claim 2, further comprising a variable nozzle type turbocharger supplying air by utilizing an exhaust gas flow, the turbocharger including a turbine portion provided at the first exhaust path,
- wherein the exhaust flow rate adjusting section is provided with the turbine portion,
- wherein the supply flow rate adjusting section is provided with a flow rate adjusting valve adjusting a flow rate the first exhaust gas recirculating path,
- wherein the first exhaust gas recirculating path is connected to a portion of the first exhaust path in an upstream side of the turbine portion, and
- wherein the control section controls an opening degree of a vane provided in the turbine portion, and an opening degree of the flow rate adjusting valve.

12. The exhaust gas purifying apparatus according to claim 2, further comprising an exhaust throttle valve provided in a portion of the first exhaust path in a downstream side of a joint portion between the first exhaust gas recirculating path and the first exhaust path,
- wherein the exhaust flow rate adjusting section is provided with the exhaust throttle valve,
- wherein the supply flow rate adjusting section is provided with a flow rate adjusting valve adjusting a flow rate the first exhaust gas recirculating path, and
- wherein the control section controls an opening degree of the exhaust throttle valve, and an opening degree of the flow rate adjusting valve.

* * * * *